United States Patent [19]
Picaud

[11] Patent Number: 6,081,595
[45] Date of Patent: *Jun. 27, 2000

[54] MOBILE RADIO TERMINAL ADAPTED TO RECEIVE A PROTECTIVE COVER

[75] Inventor: Philippe Picaud, Neuilly sur Seine, France

[73] Assignee: Alcatel Mobile Phones, Paris, France

[ * ] Notice: This patent issued on a continued prosecution application filed under 37 CFR 1.53(d), and is subject to the twenty year patent term provisions of 35 U.S.C. 154(a)(2).

[21] Appl. No.: 08/713,699

[22] Filed: Sep. 13, 1996

[30] Foreign Application Priority Data

Sep. 14, 1995 [FR] France .................................. 95 10765

[51] Int. Cl.⁷ ..................................................... H04M 1/00
[52] U.S. Cl. ........................................... 379/446; 379/455
[58] Field of Search ..................................... 379/446, 426, 379/454, 447, 455, 449; 455/348, 349, 344, 347, 351, 89, 90; 248/316.4; 224/929, 930, 269

[56] References Cited

U.S. PATENT DOCUMENTS

| 4,534,063 | 8/1985 | Krumin et al. | 455/348 |
| 5,097,997 | 3/1992 | Kipnis et al. | 224/269 |
| 5,140,632 | 8/1992 | Antent . | |
| 5,189,698 | 2/1993 | Hakanen | 379/455 |
| 5,666,273 | 9/1997 | Kurcbart | 455/347 |

FOREIGN PATENT DOCUMENTS

0414365A2  2/1991  European Pat. Off. .

Primary Examiner—Jack Chiang
Attorney, Agent, or Firm—Sughrue, Mion, Zinn, Macpeak & Seas, PLLC

[57] ABSTRACT

A mobile radio terminal is adapted to receive a protective cover and includes guides that cooperate with fixing arrangements on the cover. The guide is accessible to the fixing arrangements via one face of the terminal so that the cover is removable.

2 Claims, 2 Drawing Sheets

FIG. 1
FIG. 2
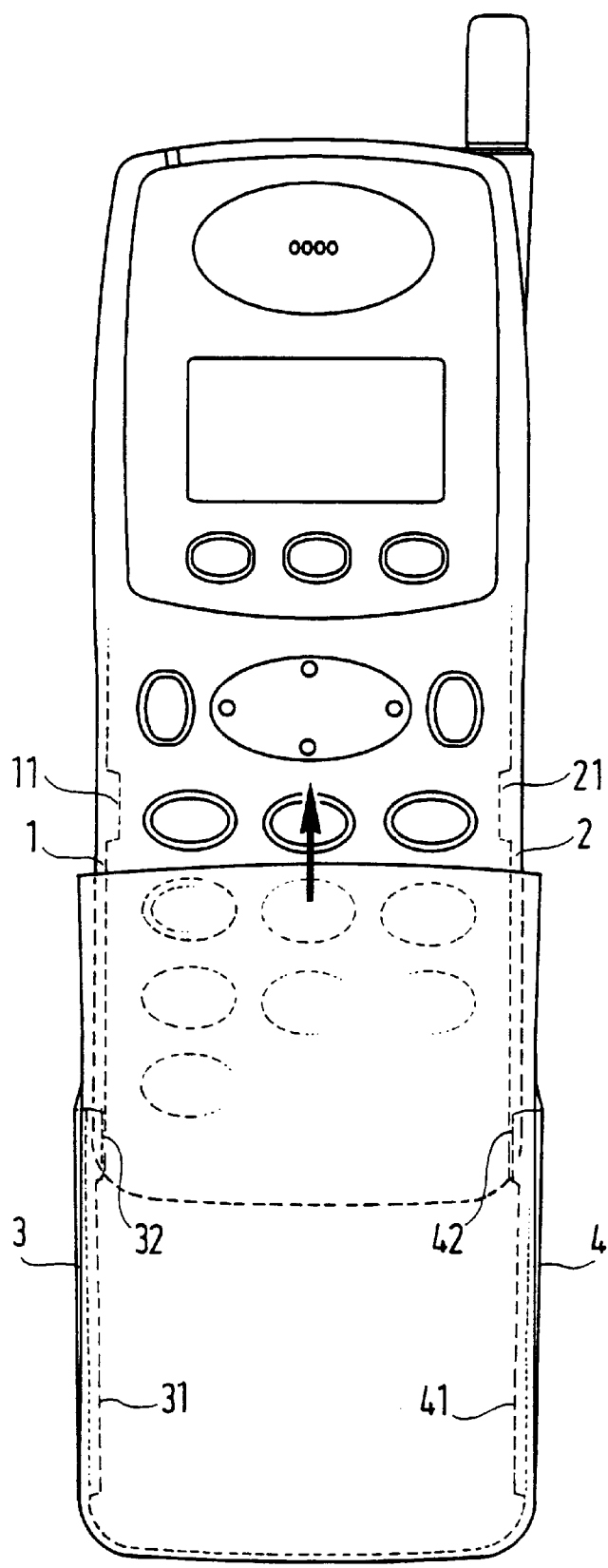
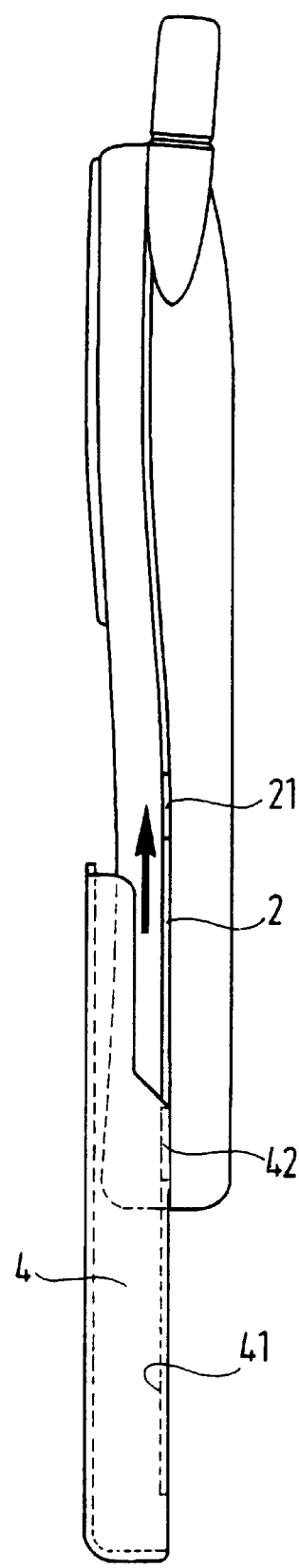

FIG. 3
FIG. 4
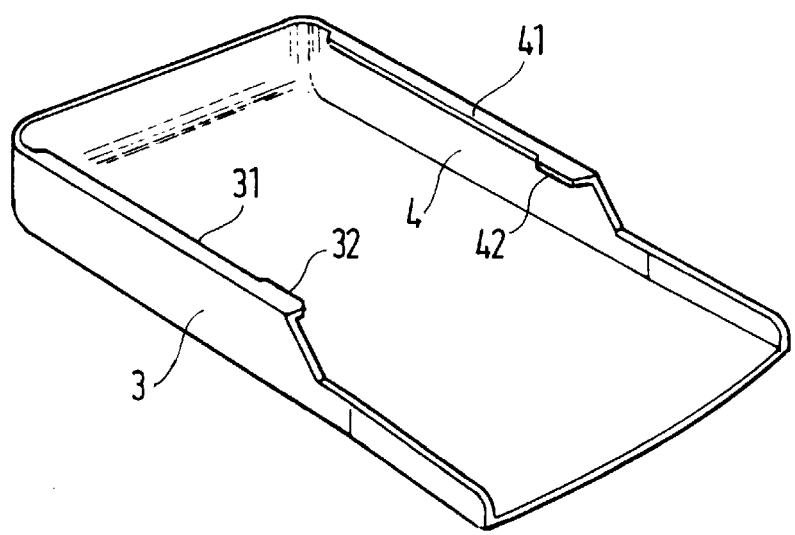
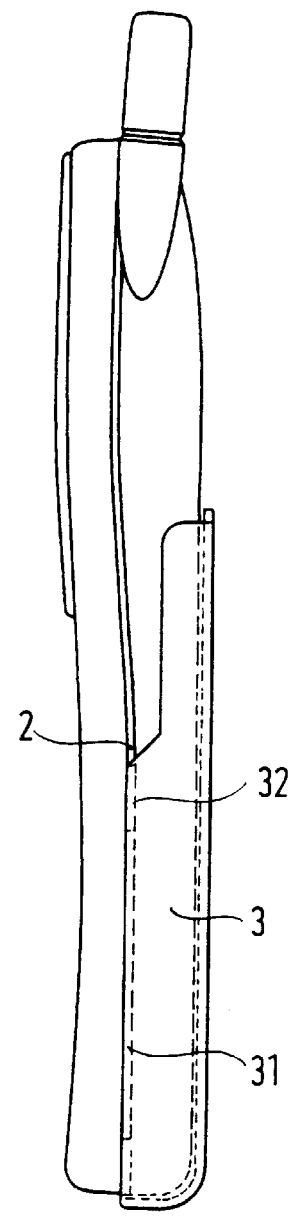

MOBILE RADIO TERMINAL ADAPTED TO RECEIVE A PROTECTIVE COVER

BACKGROUND OF THE INVENTION

1. Field of the Invention

The present invention concerns a mobile radio terminal adapted to receive a protective cover.

By mobile radio terminals is meant not only mobile telephones in particular, but also, and more generally, all terminals that receive or transmit information by means of a radio link.

2. Description of the Prior Art

These terminals often include control and indicator devices such as a keypad and a display screen. As these devices are relatively fragile, it is necessary to protect them. Various solutions have already been proposed to this end.

A first solution is to provide a flexible material case similar to those used for other portable devices, such as cameras, for example. Apart from the quantity of material that it requires, a case of this kind requires a shaping and assembly operation. Moreover, it significantly increases the bulk of the terminal, which goes against the wishes of the user and the manufacturer of a terminal of this kind.

A second solution already used for mobile telephones is to provide a flap hinged to the base of the body of the terminal. When the terminal is not in use this flap is folded against the keypad in order to protect it, whereas when the terminal is in use the flap is substantially aligned with the axis of the body. This is a relatively complex mechanical arrangement involving the use of a hinge. What is more, an arrangement of this kind has some inherent fragility, especially in the in-use configuration, which goes against the intended object.

A third solution described in patent application DE 38 36 406 is to provide a sleeve that is slidably mounted on the body of the terminal. When the terminal is not in use the sleeve covers the body whereas when the terminal is in use it is aligned with the body and therefore increases the length of the terminal. Once again, in the in-use configuration, the terminal is relatively fragile because of this combination of two parts joined together at their ends. Moreover, the overall size of the terminal is significantly increased.

Accordingly, an object of the present invention is to provide a terminal adapted to receive a protective cover of extreme mechanical simplicity, low cost and great strength.

SUMMARY OF THE INVENTION

A mobile radio terminal is adapted to receive a protective cover and includes guide means adapted to cooperate with fixing means on the cover and accessible to the fixing means via one face of the terminal so that the cover is removable.

The protective cover serves no purpose when the terminal is being used, and it is therefore not necessary for it to remain on the terminal. The cover thus becomes an accessory of the terminal. The user can therefore choose whether or not to purchase it, to fit it to the terminal or remove it, to keep it on their person or not.

The terminal advantageously includes locking means adapted to cooperate with locking means on the cover to hold the cover at a predetermined position.

The guide means are disposed symmetrically so that the cover can be fixed either to a front face or to a rear face of the terminal.

Thus it is highly convenient to stow the cover on the back of the terminal when the terminal is being used. This relieves the user of thinking about where to put it and reduces the possibility of losing it.

The terminal is not made more fragile and its overall size is not significantly altered.

The invention naturally concerns the terminal provided with the cover.

This invention will now emerge more clearly and in more detail from the following description of one embodiment given by way of non-limiting and illustrative example only with reference to the accompanying drawings.

BRIEF DESCRIPTION OF THE DRAWINGS

FIG. 1 shows a front view of a terminal of the invention during fitting of the cover.

FIG. 2 is a side view of the terminal shown in FIG. 1.

FIG. 3 shows a cover designed for the terminal of the invention.

FIG. 4 shows a terminal with the cover fitted to its rear face.

DETAILED DESCRIPTION OF THE PREFERRED EMBODIMENT

Items shown in more than one figure are always identified by the same reference number.

Referring to FIGS. 1 and 2, the terminal has a first groove 1 on its lefthand lateral face and a second groove 2 on its righthand lateral face, both these grooves extending onto the bottom face.

First and second cavities 11 and 21 are formed in the first and second grooves 1 and 2, respectively.

The cover, which is also shown in perspective in FIG. 3, has a main face, a lefthand lateral face 3, a righthand lateral face 4 and a bottom face respectively designed to overlie the front face, the lefthand lateral face, the righthand lateral face and the bottom face of the terminal.

The lefthand lateral face 3 and the righthand lateral face 4 of the cover have respective first and second rims 31 and 41. These rims extend inwards, are substantially parallel to the main face and are disposed on the opposite edge of the lateral faces 31, 41 to the main face.

The first and second rims 31 and 41 have respective first and second projections 32 and 42.

The cover is designed to be engaged with the terminal via its bottom face, the rims 31, 41 sliding in the corresponding grooves 1, 2. Thus the distance between the rims 31, 41 is substantially the same as that between the grooves 1, 2. Likewise, the width of the grooves is similar to the thickness of the rims. Finally, the distance between the cavities and the bottom face of the terminal is equivalent to that between the projections and the bottom face of the cover.

The first and second projections 32 and 42 are adapted to engage in the first and second cavities 11 and 21, respectively. To this end, the cover has the flexibility required to enable the two projections to move apart sufficiently to engage in the corresponding grooves.

The combination of the projections and the cavities holds the cover in a predetermined position relative to the terminal, preventing it slipping.

The projections are engaged in the grooves and the cover is slid along until these projections engage in the corresponding cavities.

Note that a single projection and a single cavity would be sufficient to retain the cover.

The embodiment shown has a particular mechanical arrangement that is obviously not the only one enabling the invention to be put into effect.

For example, an equivalent function may be achieved by providing ribs in place of the grooves on the terminal, these ribs being designed to cooperate with corresponding grooves on the cover.

Accordingly, the essential feature of the invention is to provide guide means on the terminal that cooperate with fixing means on the cover, these two means being in contact via one face of the terminal.

Likewise, the embodiment described has the projections on the rims on the cover and the cavities in the grooves. Projections could equally well be provided in the grooves and cavities in the rims.

Thus a plurality of solutions are available for holding the cover in a predetermined position relative to the terminal.

These solutions consist in providing locking means on the terminal that cooperate with locking means on the cover.

According to an additional feature of the invention, the guide means 1, 2 are symmetrically disposed on the terminal so that the cover can be fitted to the rear face of the terminal, as shown in FIG. 4.

This is particularly convenient for storing the cover when using the terminal.

In this case a single projection can be provided on one rim of the cover, but it is necessary to have both the cavities so that this projection can engage in one or the other of the cavities according to whether the cover is overlying the front face or the rear face of the terminal.

There is claimed:

1. In combination, a mobile radio terminal and a separably removable cover, said cover having three parallel integral faces, comprising a cover main face between two opposite cover lateral faces and having an open end, said cover slidably insertably receiving said terminal within said open end, covering three corresponding parallel faces of the terminal including an operating face between two opposite terminal lateral faces, said terminal also comprising a back face opposite to that of said operating face, wherein said two opposite parallel faces of said terminal and of said cover comprise, integral therewith, respective engageable rims and grooves from said open end so that the initially separated cover is removably coupled to the terminal simply by inserting rims into grooves and sliding the cover onto at least a portion of the terminal, and wherein respective engageable rims and grooves are symmetrically disposed with respect to said operating and back faces, so that said cover can be inserted to overlie either of said operating and back faces of said terminal.

2. A mobile radio terminal and cover combination in accordance with claim 1, wherein said terminal and said cover comprise locking means including an elastic lock on one of said cover and terminal engaging a lock receiving part on said other of said cover and terminal, for removably locking the inserted cover in position where it covers said portion of the terminal.

* * * * *